UNITED STATES PATENT OFFICE.

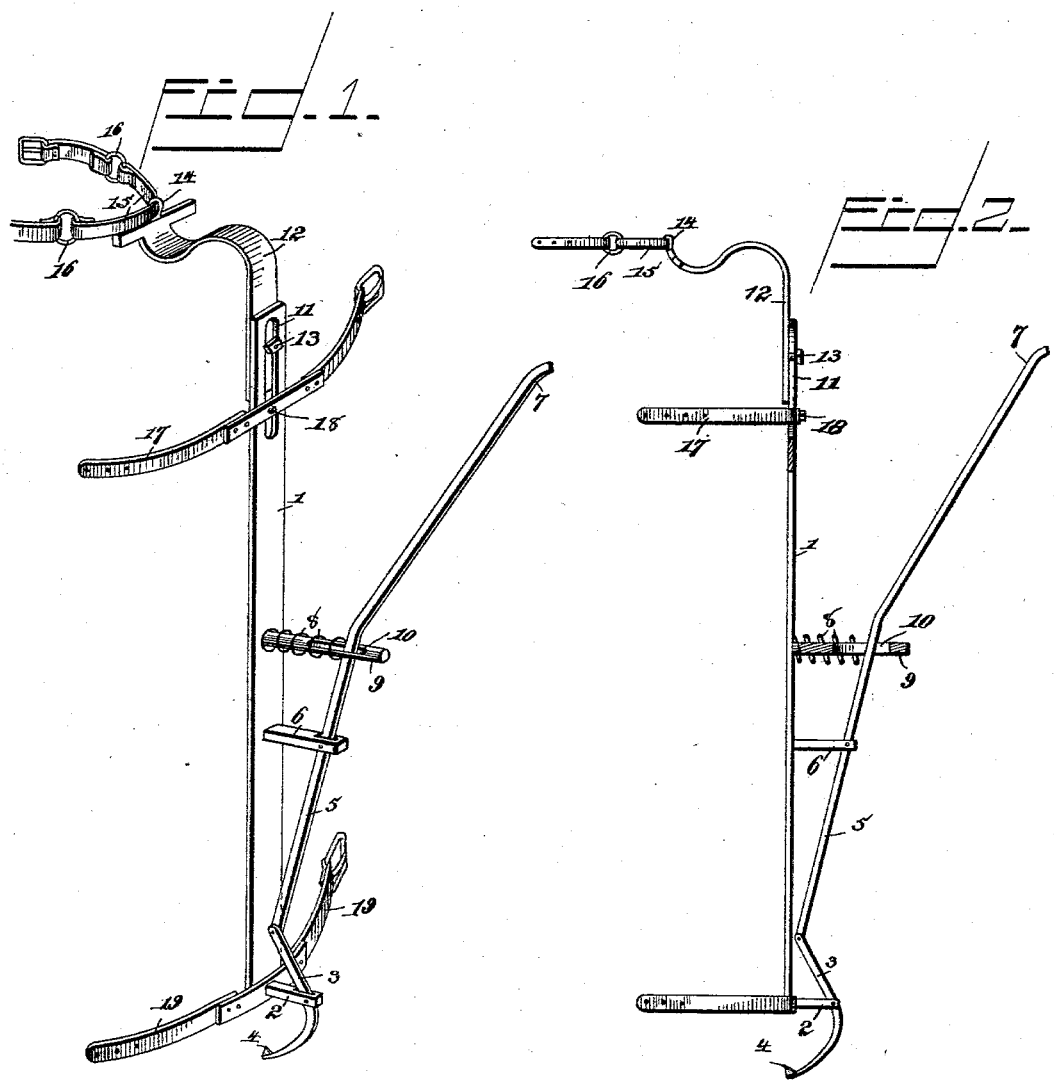

WILLIAM P. MARQUIS, OF MARQUETTE, NEBRASKA.

ANIMAL-POKE.

SPECIFICATION forming part of Letters Patent No. 453,197, dated June 2, 1891.

Application filed February 20, 1891. Serial No. 382,190. (No model.)

*To all whom it may concern:*

Be it known that I, WILLIAM P. MARQUIS, a citizen of the United States, residing at Marquette, in the county of Hamilton and State of Nebraska, have invented a new and useful Animal-Poke, of which the following is a specification.

The invention relates to improvements in animal-pokes.

The object of the present invention is to provide a simple and inexpensive animal-poke adapted to be conveniently attached to an animal without annoying the latter and capable of preventing the same breaking through or damaging fences.

The invention consists in the construction and novel combination and arrangement of parts hereinafter fully described, illustrated in the accompanying drawings, and pointed out in the claims hereto appended.

In the drawings, Figure 1 is a perspective view of an animal-poke constructed in accordance with this invention. Fig. 2 is a side elevation of the same, partly in section.

Referring to the accompanying drawings, 1 designates a plate or bar constructed of metal and adapted to be secured to the head of an animal and provided at its lower outer end with a fulcrum-post 2, in which is pivoted a barb-lever 3, provided at its outer end with a point 4, arranged to engage the nose of an animal to pierce the nose when the animal attempts to pass through a fence or the like. The barb-lever 3 has its inner end pivotally connected to an operating-lever 5, which is fulcrumed intermediate of its ends in a post 6, arranged about midway the length of the plate or bar 1, and the operating-lever is slightly bent at its middle, and is arranged at an angle to the plate or bar 1, and is adapted to have its inner or upper end 7 depressed to force the point 4 of the barb-lever into the nose of an animal. The barb-lever is normally held out of engagement with the nose of an animal by a spiral spring 8, arranged on a rod 9, which has its inner end secured to the plate or bar 1, and is provided at its outer end with a longitudinal slot 10. The operating-lever is arranged in the slot 10, and its movement is limited thereby to prevent the barb-lever injuring the nose of an animal, and the spring 8, which is coiled on the rod 9, is interposed between the plate or bar 1 and the operating-lever and keeps the latter at the outer end of the slot 10 to maintain the barb-lever normally out of contact with the animal's nose. The inner end of the plate or bar 1 is provided with a longitudinal slot 11, and secured to this end of the bar or plate 1 is an extension 12, adapted to be adjusted to enable the animal-poke to be readily secured to the head of any animal. The extension 12 is curved and is arranged on the neck of an animal, and the bar or plate 1 extends along the face of the same, and the extension is adjusted by means of a set-screw 13, arranged in the slot 11. The end 14 of the extension 12 is provided with a loop, through which passes a strap 15, adapted to be secured around the neck of an animal, and provided with rings 16, to which may be conveniently secured a rope or hitching-strap. The device is adapted to serve as a halter, and is provided with an adjustable brow-band or strap 17, which is centrally secured to the bar or plate 1 by a set-screw 18 and is designed to be secured between the horns and the eyes, and is adapted to be adjusted by means of the slot 11 and the set-screw 18 to facilitate this arrangement. The lower or outer end of the bar or plate 1 is secured to the animal by a strap 19, which passes around the nose portion.

It will readily be seen that the animal-poke is simple and inexpensive in construction and is adapted to be readily secured to an animal and adjusted to the size thereof, and is capable of preventing an animal injuring a fence or the like, and that it also serves as a halter.

Having thus described my invention, what I claim is—

1. An animal-poke comprising the plate or bar designed to be secured to the head of an animal, the barb-lever fulcrumed at the outer end of the bar or plate and arranged to engage the nose of an animal, and the operating-lever connected with the barb-lever and arranged to be depressed to force the barb-lever into the nose of an animal, substantially as described.

2. An animal-poke comprising a plate or bar designed to be secured to the head of an animal, the barb-lever fulcrumed at the outer end of the bar or plate and arranged to engage the nose of an animal, the operating-lever fulcrumed intermediate its ends and arranged at an angle to the plate or bar and having one end connected to the barb-lever, and the spring interposed between the operating-lever and the plate or bar, substantially as described.

3. In an animal-poke, the combination of the plate or bar provided with fulcrum-posts 2 and 6, the barb-lever mounted on the post 2, the operating-lever fulcrumed on the post 6 and connected to the barb-lever, the rod secured to the plate or bar and provided with a longitudinal slot to receive the operating-lever, and the spring arranged on the rod and interposed between the operating-lever and the plate or bar, substantially as described.

4. In an animal-poke, the combination of the plate or bar provided at its inner end with the longitudinal slot 11, the barb-lever arranged at the outer ends of the plate or bar, the operating-lever connected to the barb-lever, the strap 19, arranged at the outer end of the lever, the extension 12, adapted to be adjusted and provided with a set-screw arranged in the slot 11, and the strap or band 17, substantially as described.

In testimony that I claim the foregoing as my own I have hereto affixed my signature in presence of two witnesses.

WILLIAM P. MARQUIS.

Witnesses:
F. M. HOLLEY,
G. H. FARLEY.